United States Patent
Petria et al.

(10) Patent No.: US 11,617,104 B2
(45) Date of Patent: Mar. 28, 2023

(54) SELECTIVE RELAY OF NETWORK PROTOCOL DATA UNITS IN A WIRELESS MESH NETWORK

(71) Applicant: NXP USA, Inc., Austin, TX (US)

(72) Inventors: Silviu Petrut Petria, Stalpeni (RO); Andrei Istodorescu, Magurele (RO); Teodor Cosmin Grumei, Pitesti (RO)

(73) Assignee: NXP USA, Inc., Austin, TX (US)

( * ) Notice: Subject to any disclaimer, the term of this patent is extended or adjusted under 35 U.S.C. 154(b) by 113 days.

(21) Appl. No.: 17/064,158

(22) Filed: Oct. 6, 2020

(65) Prior Publication Data

US 2022/0038949 A1 Feb. 3, 2022

(30) Foreign Application Priority Data

Jul. 31, 2020 (RO) .............................. a 2020 00484

(51) Int. Cl.
| | |
|---|---|
| H04W 28/06 | (2009.01) |
| H04W 28/14 | (2009.01) |
| H04W 28/04 | (2009.01) |
| H04L 1/1607 | (2023.01) |
| H04W 74/08 | (2009.01) |
| H04W 84/18 | (2009.01) |

(52) U.S. Cl.
CPC ........... *H04W 28/06* (2013.01); *H04L 1/1621* (2013.01); *H04W 28/04* (2013.01); *H04W 28/14* (2013.01); *H04W 74/085* (2013.01); *H04W 84/18* (2013.01)

(58) Field of Classification Search
CPC ... H04W 28/14; H04W 74/085; H04W 28/04; H04W 28/06; H04W 84/18; H04W 28/0273; H04W 40/22; H04L 1/08; H04L 1/1621; H04L 2001/0097
See application file for complete search history.

(56) References Cited

U.S. PATENT DOCUMENTS

| | | | |
|---|---|---|---|
| 10,321,379 B2 | 6/2019 | Ge | |
| 2015/0071074 A1* | 3/2015 | Zaidi | H04L 47/24 370/235.1 |
| 2016/0249232 A1* | 8/2016 | Uchino | H04W 80/02 |
| 2019/0014497 A1* | 1/2019 | Turon | H04L 1/1614 |
| 2021/0226986 A1* | 7/2021 | Bartolucci | G06F 16/27 |

FOREIGN PATENT DOCUMENTS

WO 2019045890 A1 3/2019

* cited by examiner

*Primary Examiner* — Mandish K Randhawa

(57) ABSTRACT

A node in a wireless mesh network determines that a threshold level of duplicate network protocol data units (PDUs) are received. Further, the node receives one or more network PDUs comprising respective segments of transport data in a transport PDU. The node relays a subset of the received one or more network PDUs comprising respective segments to one or more neighboring nodes. The subset is relayed based on determination that the node has received a threshold level of duplicate network PDUs.

20 Claims, 6 Drawing Sheets

SELECTIVE RELAY OF NETWORK PROTOCOL DATA UNITS IN A WIRELESS MESH NETWORK

FIELD OF USE

This disclosure generally relates to wireless mesh network operation, and more particularly to a node which selective relays network protocol data units (PDUs) in the wireless mesh network.

BACKGROUND

A wireless mesh network is a communication network made up of nodes organized in a mesh topology. In the wireless mesh network, a source node generates a message to be transmitted to a destination node. The source node then relays the message to one or more nodes in communication with the source node. Each node which receives the message relays the message to one or more nodes in communication with the receiving node. The one or more nodes continue to relay the message to other nodes in the wireless mesh network until the destination node receives the message. The relaying of the message by the nodes in the wireless mesh network over multiple paths to reach the destination node increases chances that the message will reach the destination node compared to transmitting the message over a single path to reach the destination.

Figure 1:
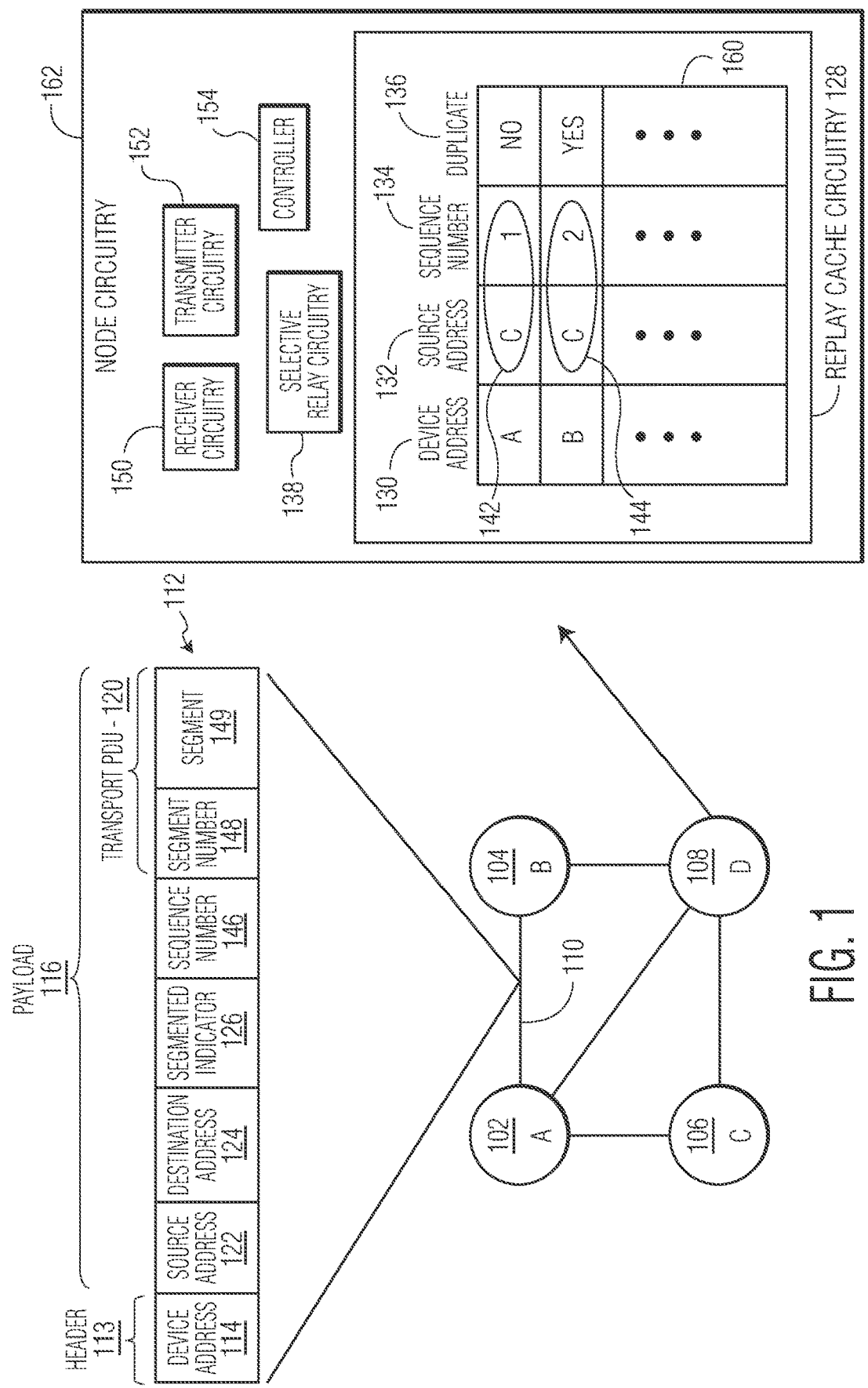
FIG. 1 is an example block diagram of a wireless mesh network arranged to selectively relay network protocol data units (PDU) in accordance with embodiments of the invention.

The drawings are for the purpose of illustrating example embodiments, but it is understood that the embodiments are not limited to the arrangements and instrumentality shown in the drawings.

DETAILED DESCRIPTION

The description that follows includes example systems, methods, techniques, and program flows related to selective relay of network protocol data units (PDUs) by a node in a wireless mesh network. The network PDU has a header which defines a source address of a source node and destination address of a destination node. The network PDU also has a payload which defines data to communicate over the wireless mesh network. In examples, the data is divided into segments when the data itself is larger than a maximum transport unit (MTU). Each network PDU having the segment is then selectively relayed by nodes of the wireless mesh network to respective neighboring nodes to transmit the segment from the source node to the destination node. In examples, one node selectively relays a subset of the received network PDUs with a segment to one or more other nodes in communication with the one node. The subset of the received network PDUs is determined based on a segment number of a segment in a received network PDU or whether the node which sent the network PDU has a single link neighbor. By performing the selective relay, fewer network PDU are transmitted or received over the wireless mesh network, reducing traffic over the wireless mesh network. Also, the nodes of the wireless mesh network consume less power compared to relaying all received network PDUs. Well known instructions, protocols, structures, and techniques have not been shown in detail in order not to obfuscate the description.

Example System

FIG. 1 is an example block diagram of a wireless mesh network 100 with nodes arranged to selectively relay network PDUs in accordance with embodiments of the invention. The wireless mesh network 100 is a communication network made up of the nodes, examples of which are shown as nodes 102, 104, 106, 108 that communicate with a wireless communication protocol such as Bluetooth Mesh. Bluetooth Mesh defines a wireless communication protocol for many-to-many communication over Bluetooth radio and is managed by the Bluetooth Special Interest Group (SIG). In examples, the node may take the form of a computer device or Internet of Things (IOT) device and implemented using circuitry such as analog circuitry, mix signal circuitry, memory circuitry, logic circuitry, processing circuitry arranged to execute code stored in a memory and when executed by the processing circuitry perform the disclosed functions of the node, or combinations thereof.

In examples, each of the nodes implements a mesh architecture stack which partitions communication functions into abstract layers, examples of which include a transport layer, a network layer, and bearer layer of the mesh architecture stack. The transport layer segments data into chunks and reassembles the chunks into the data. In the transport layer, the data which is segmented is encapsulated in a transport PDU. The network layer defines relay functionality for extending a range of the transport PDU. In the network layer, the transport PDU is encapsulated in a network PDU. The bearer layer defines how the network PDU is exchanged between nodes. In the bearer layer, the network PDU is encapsulated in a network packet.

In the wireless mesh topology, network PDUs are not routed over a specific path from a source node to a destination nodes but rather by via multiple paths from the source node to the destination node. A link, an example of which is link 110, indicates whether nodes at ends of the link are in wireless communication range or radio range and can wirelessly communicate. For instance, node 102 and node 104 coupled by the link 110 are in wireless communication range while node 104 and node 106 which are not coupled by a link are not in wireless communication range. As another example, node 106 coupled to node 102 and node 108 by links are in wireless communication range. The wireless mesh network 100 shows wireless communication by other nodes. In examples, a first node in wireless communication range and able to reliably communicate with a second node may be a considered a neighbor to the second node.

The network packet associated with the bearer layer may take many forms. In Bluetooth Mesh, the network packet may take the form of an advertising channel PDU 112 which is sent and received over the links. The advertising channel PDUs 112 comprises a plurality of fields including a header 113 with a device address field 114 and a payload field 116. In examples, a device address in the device address field 114 may be a 6 byte address which identifies a neighboring node from where the advertising channel PDUs 112 was received. The payload field 116 may define a network PDU. The network PDU may have a header with a plurality of fields including a source address field 122, a destination address field 124, a segmented indicator field 126, a sequence number field 146, and a transport PDU field 120 comprising a segment number 148 and a segment 149.

The transport PDU field 120 defines a transport PDU with data referred to as transport data which is to be communicated over the wireless mesh network 100. In examples, the transport data may be associated with an application running on a node. If the transport data exceeds a maximum transport unit (MTU), then the node may segment the transport data into a plurality of segments and each placed in a respective transport PDU. For example, the transport layer associated with Bluetooth Mesh may segment the transport data into as many as 64 segments which are 15 bytes each if the MTU is 15 bytes. The segment number field 148 of the transport PDU may have a segment number to uniquely identify the segment 149 in the respective transport PDU and permit subsequent reassembly of the segments into the transport data.

In examples, the segmented indicator field 126 may indicate whether the transport data in the transport PDU is segmented. If the transport data is not segmented, then the segmented indicator field 126 may have one value and if transport data is segmented, then the segmented indicator field 126 may have another value. In examples, each node may also maintain a sequence number which the node changes each time the node transmits another network PDU. In examples, the sequence number may be incremented or decremented each time the node transmits a network PDU. The node may store the sequence number of the network PDU in the sequence number field 146 of the network PDU. In examples, the source address field 122 and destination address field 124 may be each two byte addresses which identify a source node where a transport PDU 120 in the payload 116 originated and a destination node where the transport PDU 120 is to be sent. Further, the source address field 122 may be a unicast address and the destination address field 124 may be a unicast address or group address. In Bluetooth Mesh, the sequence number in the sequence number field 146 of the transport PDU along with the source address in the source address field 122 may uniquely identify the network PDU. A node may uniquely identify the network PDU in other ways as well.

Each of the nodes may have circuitry. Node circuitry 162 is an example of such circuitry which includes a controller 154, receiver circuitry 150, transmitter circuitry 152, replay cache circuitry 128, and selective relay circuitry 138. Each circuitry (and the controller 154) may be implemented with analog circuitry, mixed signal circuitry, memory circuitry, logic circuitry, processing circuitry arranged to execute code stored in a memory performs the disclosed functions, or combinations thereof, or combinations thereof.

In examples, the controller 154 may coordinate operations between one or more of the receiver circuitry 150, transmitter circuitry 152, replay cache circuitry 128, and selective relay circuitry 138 as described herein. The receiver circuitry 150 may facilitate wireless receipt of network PDUs by the node from one or more neighboring nodes and the transmitter circuitry 152 may facilitate wireless transmission of network PDUs by the node to one or more neighboring nodes. The replay cache circuitry 128 may comprise a data structure stored in a memory. The data structure such as an array or linked list may comprise a table 160 that indicates whether the node receives network PDUs in duplicate. In examples, the table 160 may include a duplicate field 136 which indicates whether the node previously received a network PDU. The table 160 may also uniquely identifies the network PDU. A source address of the network PDU in field 132 and a sequence number of the network PDU in field 134 may uniquely identify the network PDU. The table 160 may also associate a device address of a neighboring node which sent the network PDU in field 130. One or more bits may represent each of the device address, the source address, and the sequence identifier.

To illustrate, nodes, 102, 104, 106, and 108 in the example wireless mesh network 100 may be assigned addresses A, B, C, and D respectively. Each address A, B, C, or D in this example may represent a unique string of bits. Also to illustrate, a network PDU 142 associated with device address A may have a source address C, and sequence number 1 while a network PDU 144 associated with device address B may have a source address C, and sequence number 2 in the table 160. The table 160 may be populated with additional network PDUs as the node receives the additional network PDUs and an oldest received network PDUs may be deleted if the table 160 approaches fullness.

The node may receive a network PDU and the replay cache circuitry 128 may determine whether the newly received network PDU has been received for the first time. In examples, the replay cache circuitry 128 may compare one or more of the source address or sequence number in the newly received network PDU to the respective source address or sequence number of the network PDUs in the table 160. For example, the replay cache circuitry 128 may hash the source address and sequence number in the newly received network PDU with a respective source address and sequence number of the network PDUs in the table 160. If the hash indicates a match, then the node previously received the network PDU and is a duplicate network PDU. If the hash does not result in a match, then the node might not have previously received the newly received network PDU and is not a duplicate. The replay cache circuitry stores the newly received network PDU including its device address in the table 160. The table 160 may also store a duplicate indication in field 136 to indicate whether a network PDU is a duplicate. To illustrate, the network PDU 142 associated with device address A in the table 160 may be a duplicate network PDU by the indication "yes" in field 136 while the network PDU 144 associated with device address B in the table 160, for example, may not be a duplicate network PDU by the indication "no" in field 136.

Various embodiments are directed to each node performing a selective relay of a received network PDU to one or more neighboring nodes. Relaying is a process of transmitting a network PDU to one or more neighboring nodes. Selective relaying further comprises the node selectively performing the relay or not performing the relay of the received network PDU to cause a subset of received network PDUs to be relayed by the node. In examples, one node selectively relays a subset of the received network PDUs with a segment to one or more other nodes in communication with the one node. By performing the selective relay as described herein, the nodes transmit or receive fewer network PDU over the wireless mesh network 100 compared to relaying all network PDUs, reducing traffic over the wireless mesh network 100. Also, the nodes of the wireless mesh network consumes less power compared to relaying more network PDUs.

The node has the selective relay circuitry 138 to perform the selective relay as described herein. The selective relay initially begins with the selective relay circuitry 138 monitoring a number of the duplicate network PDUs received by a node. In examples, the selective relay circuitry 138 may count the number of network PDUs stored in the replay cache circuitry 128 with the duplicate indication in the field 136. If the number does not exceed a threshold amount, then the selective relay circuitry 138 causes the node to relay network PDUs over one or more of the links of the node. If the number exceeds a threshold amount, then selective relay circuitry 138 further determines for a subsequently received network PDU whether the received network PDU was received in duplicate. If the received network PDU was not received in duplicate, then the node relays the network PDU. If the received network PDU was received in duplicate, then the node determines whether the received network PDU has a segment in the transport PDU field 120. The segmented indicator field 126 may identify whether the transport PDU has a segment. If the received network PDU does not have a segment in the transport PDU field 120, the selective relay circuitry 138 causes the node to relay the network PDUs. The relay may comprise the transmitter circuitry 152 of the node transmitting the network PDUs over one or more of the links of the node. If the received network PDU has a segment in the transport PDU field 120, then the selective relay circuitry 138 causes the node to relay the network PDUs further based on the segment number in the segment number field 148. In examples, the selective relay circuit 138 relays the network PDU based on a parity of the segment number such as whether the segment number is odd or even. For example, if the segment number is odd, then the selective relay circuitry 138 relays the network PDU and if the segment number is even, then the selective relay circuitry 138 does not relay the network PDU. As another example, if the segment number is even, then the selective relay circuitry 138 relays the network PDU and if the segment number is odd, the selective relay circuitry 138 does not relay the network PDU. The relay may comprise the transmitter circuitry 152 transmitting the network PDUs to one or more neighboring nodes over one or more of the links of the node. In examples, the selective relay circuitry 138 may cause the node to relay a subset of network PDUs with odd or even segment numbers received over time.

In examples, the selective relay circuitry 138 may also relay the network PDUs based on whether the node receives the network PDU from a neighboring node which is a single link neighbor or multi-link neighbor. If the node receives the network PDU from a single link neighbor, then the selective relay circuitry 138 causes the node to relay the network PDUs. If the node receives the network PDU from a multi-link neighbor, then the selective relay circuitry 138 causes the node to relay the network PDUs based on the segment number of the network PDU described above.

Figure 2:
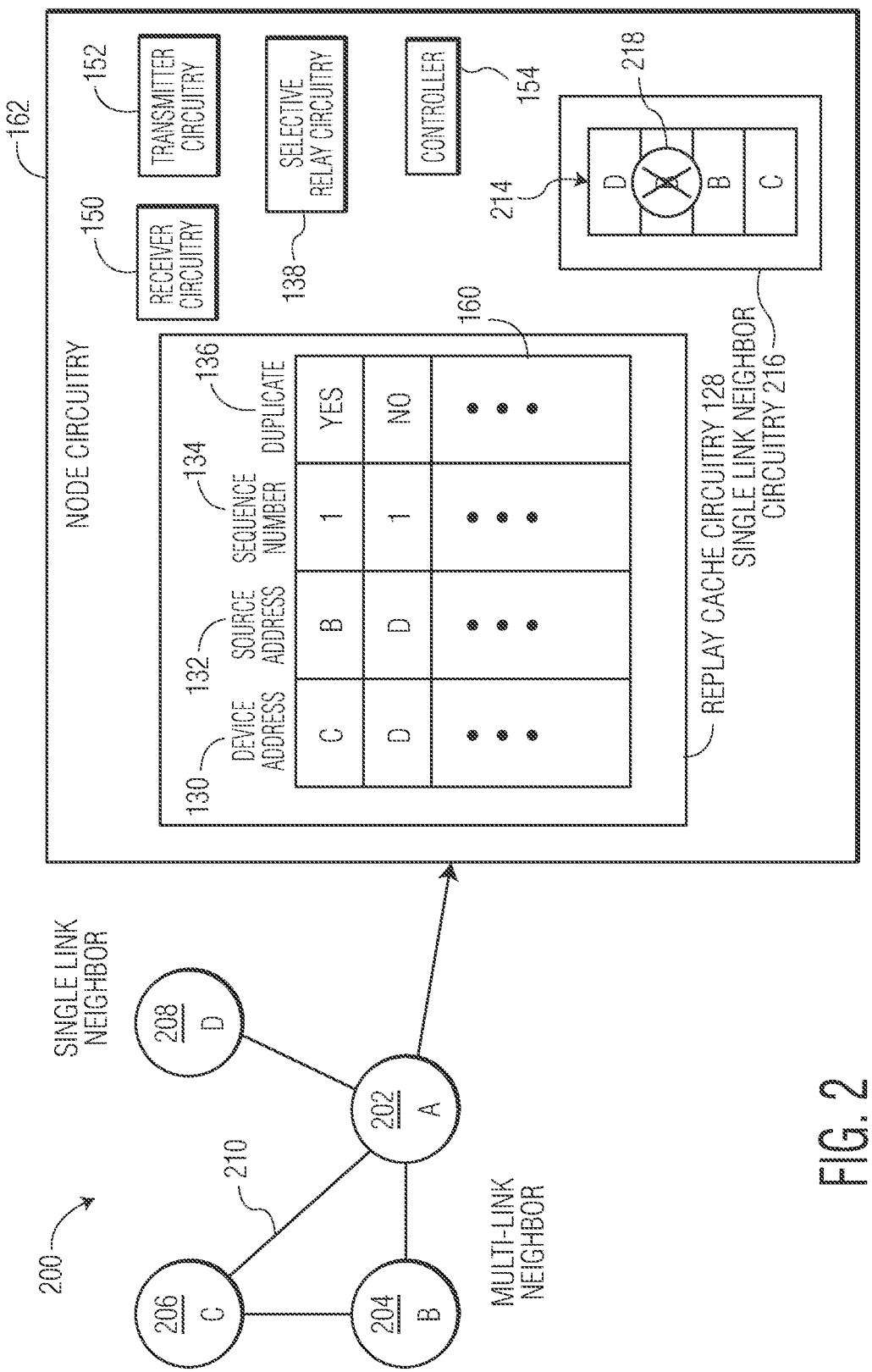
FIG. 2 is an example of a wireless mesh network topology that illustrates differences between a single link neighbor and a multi-link neighbor of a node in accordance with embodiments of the invention.

FIG. 2 is an example of a wireless mesh network topology that illustrates differences between a single link neighbor and a multi-link neighbor of a node. A wireless mesh network 200 is configured with four nodes 202, 204, 206, 208 in this example. The four nodes 202, 204, 206, 208 are labeled node A, node B, node C, and node D, respectively. Links, an example of which is shown as link 210, may indicate wireless communication between respective nodes. A single link neighbor is a neighboring node with one link to communicate. A node is not a single link neighbor if the neighboring node has more than one link to communicate. To illustrate, node A which has neighbor nodes B and C are not single link neighbors to node A (i.e., multi-link neighbors) because both neighbors B and C have two links to communicate, one of which is a link to node A. Node D is an example of a single link neighbor to node A. Node D only has one link to communicate, and the link is to node A. Node D is a single link neighbor.

A node is configured with node circuitry 162. Node circuitry 162 is an example of such circuitry and shown as controller 154, receiver circuitry 150, transmitter circuitry 152, replay cache circuitry 128, and selective relay circuitry 138. In examples, the replay cache circuitry 128 may be used to determine whether a node has a single link neighbor. The replay cache circuitry 128 may comprise the table 160 which store an indication of whether network PDUs are received by a node in duplicate. The network PDU stored in the table 160 may be compared to a network PDU received by a node to determine whether a neighboring node is a single link neighbor.

In examples, the node may compare fields associated with the received network PDU and the stored network PDUs in the table 160. The fields that are compared include the source address and sequence number. If a stored network PDU has a same source address and sequence number as the received network PDU, then the received network PDU is a duplicate of the stored network PDU. Further, if the device address indicating the neighboring node which sent the stored network PDU is not the same as the device address of the neighboring node which sent the received network PDU, then the received network PDU was also received by another neighbor. The neighboring node which sent the received network PDU is not a single link neighbor, i.e., a multi-link neighbor. If the device address indicating the neighboring node which sent the stored network PDU is the same as the device address of the neighboring node which sent the received network PDU, then the received network PDU was not received by another neighbor. The neighboring node which sent the received network PDU is a single link neighbor.

Based on the determination that a neighboring node is a single link neighbor or multi-link neighbor, the node may store an indication of whether the neighboring node is a single link neighbor. The indication may be a single link neighbor list 214 stored in single link neighbor circuitry 216. The single link neighbor circuitry 216 may have a memory for storing a data structure such an array or linked list comprising the single link neighbor list 214. The single link neighbor list 214 may identify the neighboring nodes which are single link neighbors by a respective device address. The single link neighbor list 214 may initially indicate all neighbors of a node as being single link neighbors regardless of whether they are single link neighbors. If a neighboring node is identified as not being single link neighbor, the node removes the indication of the neighboring node from the single link neighbor list 214. If a neighboring node is identified as a single link neighbor, the node does not remove the indication of the neighboring node from the single link neighbor list 214. In examples, the selective relay circuitry 138 relays the received network PDUs based on whether the network PDU was received from a single link neighbor. In examples, the controller 154 may facilitate adding or removing indications of the single link neighbors stored in the single link neighbor list 214.

To illustrate the node 202 determining that a neighboring node is a multi-link neighbor, the table 160 may store a network PDU with a device address C, a source address B, and sequence number 1. The node 202 may then receive a network PDU from node B. The received network PDU may be associated with a device address B, a source address B and sequence identifier 1. Node B is not a single link neighbor because the stored network PDU associated with device address C is the same as the received network PDU and the device addresses are different. The single link neighbor circuitry 214 may initially identify both node B and node C as single link neighbors. Based on the determination that node B is not a single link neighbor, the single link neighbor circuitry 216 may remove node B from a single link neighbor list 214 (as shown by "X" 218). This way, the single link neighbor circuitry 214 maintains a list of single link neighbors which is updated as a node receives network PDUs.

To illustrate determination of a neighboring node being a single link neighbor, the table 160 of the replay cache circuitry 128 may store an indication that node 202 received a network PDU from node D. The stored network PDU may be associated with a device address D and have a source address D and sequence identifier 1. The node 202 may then receive a network PDU from node D. The received network PDU may be associated with device address D, a source address D and sequence identifier 1. Node D is a single link neighbor because the stored network PDU associated with device address D is the same as the received network PDU associated with device address D and the device addresses are the same. Node B may not be removed from a single link neighbor list 216. This way the single link neighbor list 216 maintains a list of single link neighbors which is updated as a node receives network PDUs. The selective relay circuitry 138 may use the single link neighbor list 216 to determine whether to selectively relay a network PDU.

In some examples, the node may maintain a multi-link neighbor list rather than the single link neighbor list. Then, if a device address of a node is not in the multi-link neighbor list, then the device address of the node is a single link neighbor consistent with the functionality described above.

Example Operations

Figure 3:
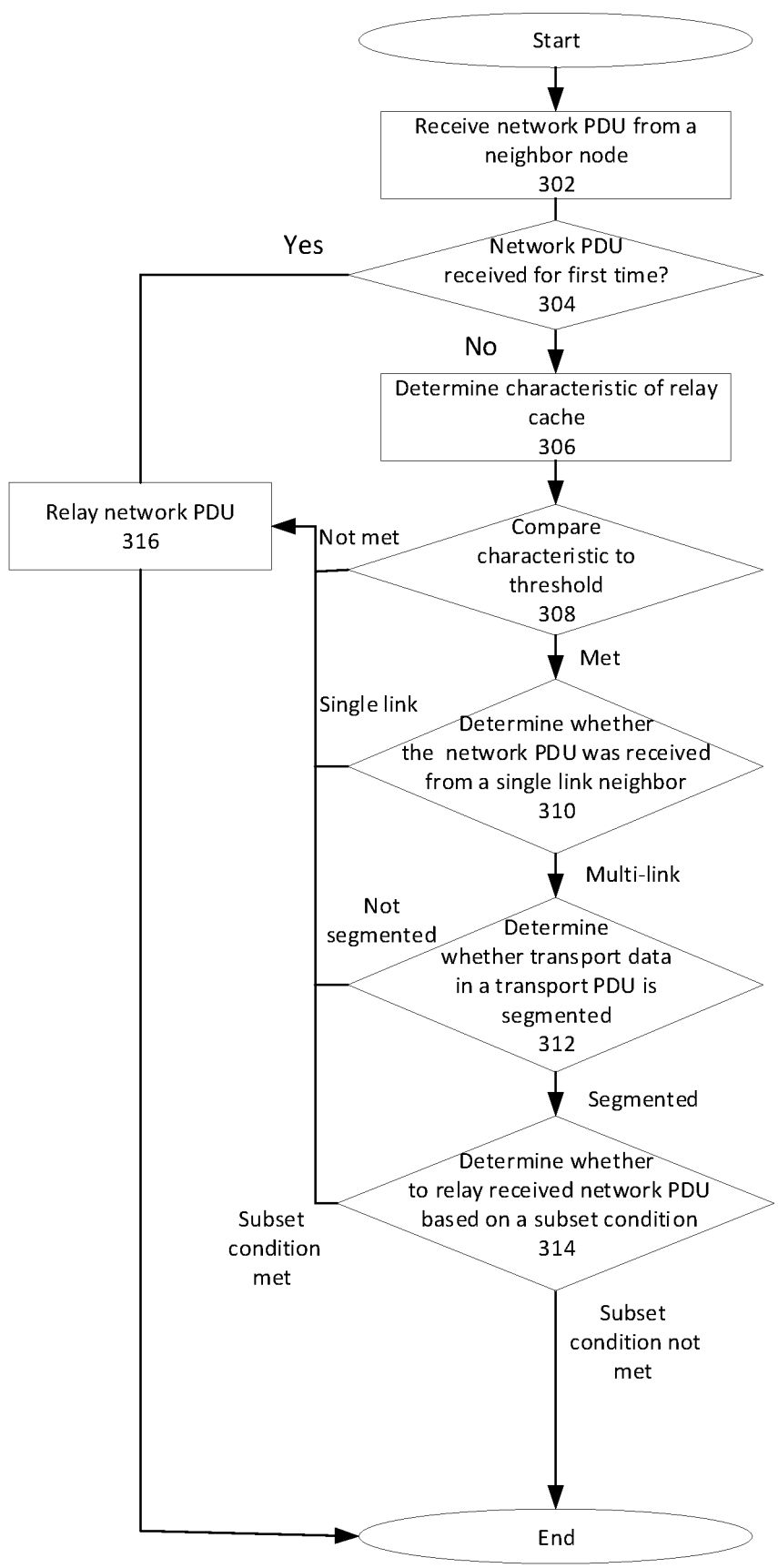
FIG. 3 is an example flow chart of functions associated with selective relay of network PDUs by a node in the wireless mesh network in accordance with embodiments of the invention.

FIG. 3 is an example flow chart of functions associated with selective relay of network PDUs by a node in the wireless mesh network in accordance with embodiments of the invention. The node may perform a function of the functions in the wireless mesh network 100 using node circuitry 162 of the node and in examples based on one or more of the selective relay circuitry 138, the single link neighbor circuitry 216, the replay cache circuitry 128, the receiver circuitry 150, the transmitter circuitry 152, or controller 154. One or more of analog circuitry, mix signal circuitry, memory circuitry, logic circuitry, or processing circuitry arranged to execute code stored in a memory and when executed by the processing circuitry may implement the disclosed functions, or combinations thereof.

At 302, a node receives a network PDU from a neighbor node in the wireless mesh network 100. The network PDU may be a payload of network packet and the network PDU may comprise a transport PDU in examples. In examples, the receiver circuitry 150 may facilitate receiving the network PDU.

At 304, the node determines whether the network PDU was received for the first time. If the table 160 stores network PDU, then the node has not received the network PDU for the first time and processing continues to 306. If the node has received the network PDU for the first time, then processing continues to 316 where selective relay circuit 138 causes the node to relay network PDU. The selective relay circuit 138 causes the node to relay the network PDU over its one or more links to neighboring nodes via the transmitter circuitry 152 in examples.

At 306, the selective relay circuitry 138 determines a characteristic of the replay cache circuitry 128. In examples, the characteristic may be one or more of a fill amount or a fill rate of the table 160 in the replay cache circuitry 128. The table 160 may store an indication of whether a network PDU was received more than once, i.e., a duplicate. The selective relay circuit 138 may determine a number of network PDUs stored in the table 160 which have been received more than once or duplicated by counting a number of network PDUs in the table 160 with the duplicate field 136 being "yes." This number of duplicates may be a fill amount associated with the table 160 which indicates a level of redundant transmissions over the wireless mesh network 100. Additionally, or alternatively, the selective relay circuit 138 may determine a rate by which network PDUs stored in the table 160 with the duplicate field 136 being "yes" increases over time. The rate by which network PDUs stored in the table 160 increases over time may be a fill rate of the table 160.

At 308, the selective relay circuitry 138 compares the characteristic of the replay cache circuitry 128 to a threshold. If the characteristic meets the threshold, then processing continues to 310. If the characteristic does not meet the threshold, then processing continues to 316 where selective relay circuit 138 causes the node to relay network PDU. The selective relay circuit 138 causes the node to relay the network PDU over its one or more links to neighboring nodes via the transmitter circuitry 152 in examples.

At 310, the selective relay circuitry 138 determines whether the received network PDU was received from a single link neighbor. The single link neighbor list 216 may identify nodes which are single link neighbors. The selective relay circuit 138 may compare the device address of the received network PDU with the device addresses in the single link neighbor list 216. If the device address associated with the received network PDU matches a device address in the single link neighbor list 214, then the selective relay circuit 138 causes the node to relay the network PDU at 316 because the network PDU is received from a single link neighbor. The node relays the network PDU over its one or more links to neighboring nodes via the transmitter circuitry 152 in examples. If the device address associated with the received network PDU does not match an address in the single link neighbor list 214, then processing continues to 312 because the node did not receive the network PDU from a single link neighbor.

At 312, the selective relay circuitry 138 determines whether transport data in a transport PDU of the network PDU is segmented. In examples, the selective relay circuitry 138 makes the determination based on the segmented indicator field 126 in the network PDU. For example, the segmented indicator field 126 may be a bit which has one value if the transport PDU does not have a segment and another value if the transport PDU has a segment. If the transport PDU does not have a segment, then the selective relay circuit 138 causes the node to relay the network PDU at 316 over its one or more links to neighboring nodes via the transmitter circuitry 152. If the transport PDU has a segment, then processing continues to 314.

At 314, the selective relay circuitry 138 determines whether to relay the received network PDU based on a subset condition. In examples, the subset condition may be to relay a subset of network PDUs received over time associated with segments. The subset condition may take many forms. For instance, the subset condition may be based on a parity of the segment number in the transport PDU of the received network PDU such as whether the segment number is odd or even. In one example, the subset condition may be to relay the network PDU if the segment number in the transport PDU is even and not to relay the network PDU if the segment number in the transport PDU is odd. In another example, the subset condition may be to relay the network PDU if the segment number in the transport PDU is odd and not to relay the network PDU if the segment number in the transport PDU is even.

In examples, a source address associated with the node which received the network PDU may dictate the subset condition. For instance, if the source address associated with the node is even, then selective relay circuit 138 may cause the node to relay the network PDU which has an even segment identifier at 316 and otherwise not relay the network PDU. As another example, if the source address associated with the element in the node is odd, then the selective relay circuit 138 may cause the node to relay the network PDU which has an odd segment identifier at 316 and otherwise not relay the network PDU. The node relays the received network PDU by transmitting the network PDU over the wireless network mesh over its one or more links to neighboring nodes via the transmitter circuitry 152 in examples. This way a number of redundant network PDUs sent in the wireless mesh network is reduced and other nodes are relied on to relay the received network PDUs over respective one or more links.

In some examples, the node may continue to relay received network PDUs in accordance with the steps 302-316, but also monitor receipt of network PDUs which are not relayed. If a node does not receive a network PDU which the node would otherwise relay if not for the subset condition, then the selective relay circuit 138 causes the node to relay all received network PDUs instead of relaying received network PDUs based on the subset condition. If the node receives a network PDU which the node would otherwise relay if not for the subset condition, then the node continues to relay the received network PDU based on the subset condition.

Figure 4:
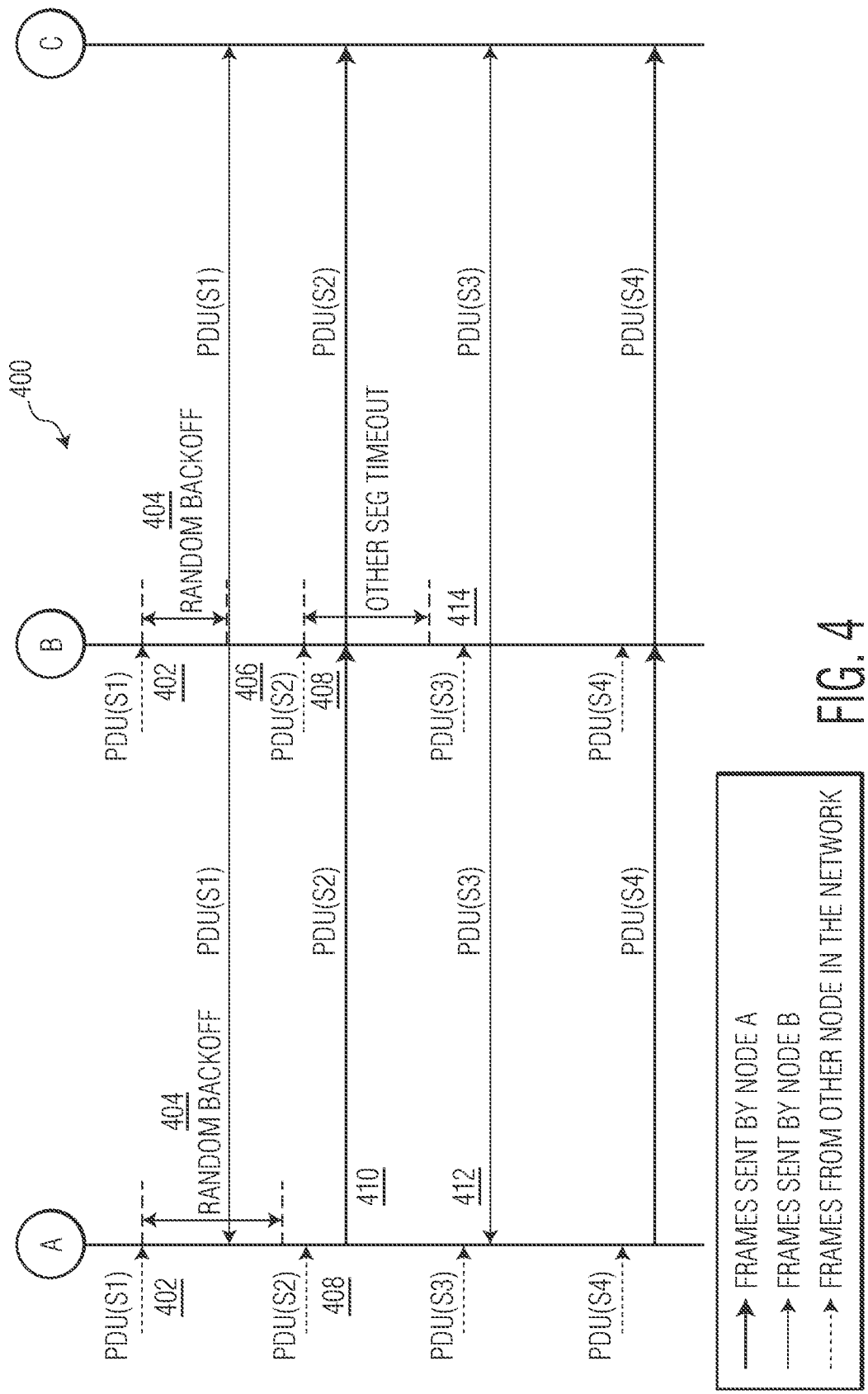
FIG. 4 illustrates an example messaging among nodes of the wireless mesh network to selectively relay network PDUs in accordance with embodiments of the invention.

FIG. 4 illustrates an example signaling 400 among nodes of an example wireless mesh network to selectively relay network PDUs in accordance with embodiments of the invention. The example wireless mesh network may have three nodes, illustrated as node A, node B, and node C configured with the circuitry 160 described above.

In this example, node A, node B, and node C may not have any single link neighbors, node A may have neighbor nodes B and C, and node B may have neighbor nodes A and C. Also in this example, a neighbor node of a node has a path to another neighbor of the node and is so marked. For instance, node A may receive a network PDU from a neighbor node C in radio range and this same network PDU from a neighbor node B also in radio range. Node A may mark node B because node B is a neighbor to node A and node B has path to node C which is a neighbor to node A. Similarly, node B may receive a network PDU from a neighbor node C and this same network PDU from a neighbor node A. Node B may mark node A because node A is a neighbor to node B and node A has a path to node C which is a neighbor to node B. In examples, analysis of the network PDUs stored in the table 160 of the selective relay circuit 138 may indicate whether a neighbor node of a node has a path to another neighbor of the node.

A network PDU with a segment $S_n$ is represented as $PDU(S_n)$. N may range from 1 to 4 corresponding to segments 1 to 4 and segment $S_n$ is representative of transport data in a transport PDU. At 402, node A and node B receives a network PDU $PDU(S_1)$ not for the first time. Node A and node B may relay $PDU(S_1)$ based on a subset condition. In this example, the subset condition may be to relay network PDUs with an even segment if the node receives an odd segment from a marked node. In examples, the subset condition may also be to relay network PDUs with an odd segment to node C if the node receives an even segment from a marked node. Until the subset condition is met and the node determines whether to relay even or odd segments, the node relays all received network PDU.

At 404, node A and node B waits for a respective backoff period. The backoff period may be a random delay before relaying $PDU(S_1)$. A random number generator may define the backoff period in examples. When the random number generator output a value in a given range, then the random backoff period ends. Otherwise, the random backoff period does not ends.

At 406, node B relays $PDU(S_1)$ after its random backoff period because node B does not receive $PDU(S_1)$ during the random backoff period from node A. $PDU(S_1)$ is transmitted to node A and node B over the wireless mesh network. Before the backoff node A ends, node A may receive $PDU(S_1)$ which was relayed by node B. Based on receiving $PDU(S_1)$ relayed by node B which is an odd segment, the subset condition is satisfied and node A may be arranged to relay network PDUs with even segments from node B and not relay $PDU(S_1)$.

At 408, node A and node B may receive $PDU(S_2)$. Node A may relay $PDU(S_2)$ at 410 because the satisfied subset condition indicates that the node A is to relay network PDUs with even segments. Node B may wait for another random backoff period because the subset condition has not yet been met for the node and it does not know whether to relay network PDUs with odd or even segments. During this random backoff period $PDU(S_2)$ is received. Based on receiving $PDU(S_2)$ which is an even segment from node A, the subset condition is satisfied. Node B is to relay network PDUs with odd segments and node B does not relay PDU $(S_2)$.

At 412, node A receives $PDU(S_3)$ and does not relay $PDU(S_3)$ because node A is to relay network PDUs with even segments.

At 414, node B receives $PDU(S_3)$ and relay $PDU(S_3)$ because node B relays network PDUs with odd segments. The transmission of network PDUs by both node A and node B is synchronized. This process may continue with node A relaying $PDU(S_4)$ and node B not relaying $PDU(S_4)$ etc. If node A detects that a network PDU which node A does not relay is not subsequently received by node A, then node A defaults to relaying all network PDUs. If node B detects that a network PDU which node B does not relay is not subsequently received by node B, then node B defaults to relaying all network PDUs.

Figure 5:
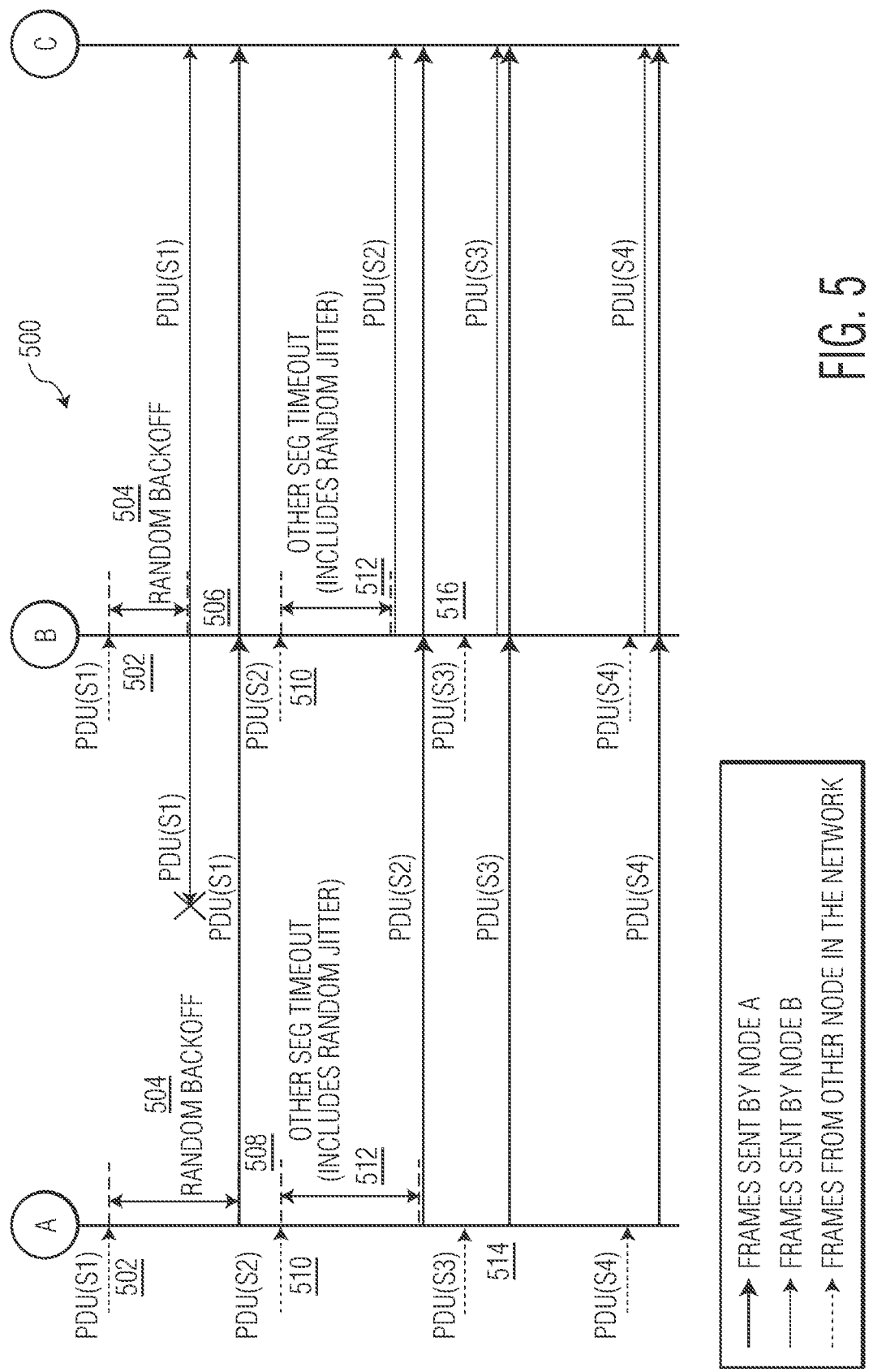
FIG. 5 illustrates another example of messaging among nodes of the wireless mesh network to selectively relay network PDUs in accordance with embodiments of the invention.

FIG. 5 illustrates another example of signaling 500 among nodes of the wireless mesh network to selectively relay network PDUs in accordance with embodiments of the invention. The wireless mesh network may be configured with four nodes, illustrated as node A, node B, and node C configured in a manner similar to that of node A, node B, node C, and node D described with respect to FIG. 4.

At 502, node A and node B receives PDU(S$_1$). At 504, node A and node B wait for a respective backoff period. At 506, node B relays PDU(S$_1$) after a backoff period because the subset condition is not satisfied. PDU(S$_1$) is transmitted to node A and node B. Node A does not receive PDU(S$_1$) due to a communication error in the wireless mesh network. Because the subset condition is not satisfied after a backoff period by node A, at 508 node A sends PDU(S$_1$). At 510, node A and node B receive PDU(S$_2$). Node A waits for a backoff period at 512 because the subset condition has not yet been satisfied and relays PDU(S$_2$) after a backoff time to node C because the subset condition is still not satisfied after the backoff period. At 512, node B also waits for a backoff period because the subset condition has not yet been satisfied and send PDU(S$_2$) because the subset condition is still not satisfied after the backoff period. At 514, node A receives PDU(S$_3$) and relays PDU(S$_3$) because the subset condition was not met after M backoffs, where M=2. At 516, node B receives PDU(S$_3$) and relays PDU(S$_3$) because the subset condition was not satisfied after M backoffs, where M=2. This process continues with node A relaying PDU(S$_4$) and node B relaying PDU(S$_4$) etc. The transmission of network PDUs by both node A and node B is not synchronized. Each node will send all segment received for the first time because each node did not detect that another node was transmitting a segment during a respective backoff period in accordance with the subset condition.

Example Apparatus

Figure 6:
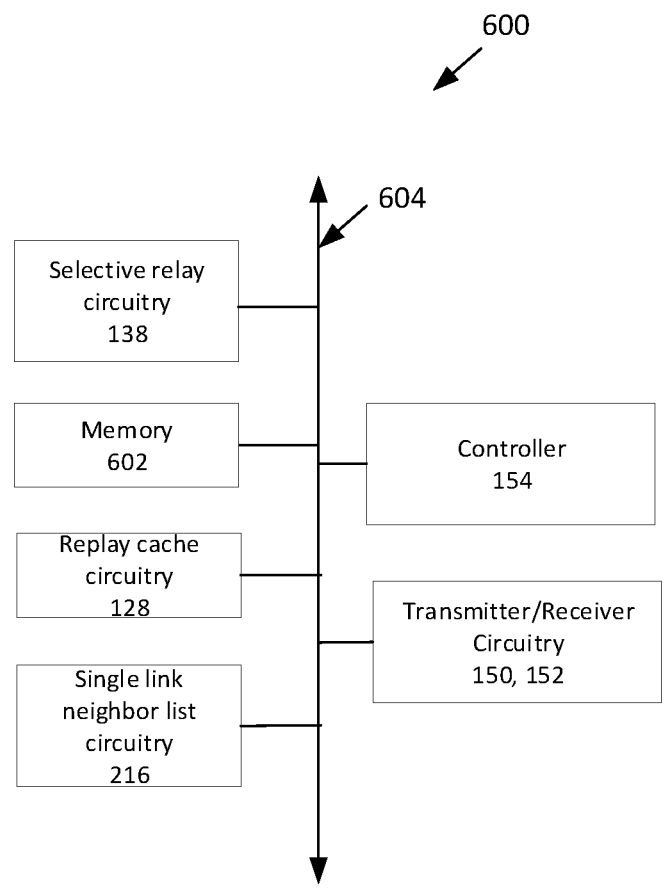
FIG. 6 is an example block diagram of a node which performs functions associated with a selective relay of network PDUs in accordance with embodiments of the invention.

FIG. 6 is an example arrangement of a node 600 such as one of nodes 102, 104, 106, 108, 202, 204, 206, 208 which performs functions associated with selective relay of network PDUs. The node 600 comprises the controller 154 (possibly including multiple processors, multiple cores, multiple nodes, and/or implementing multi-threading, etc.) and memory 602 such as system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more other possible realizations of non-transitory machine-readable media/medium. The memory 602 may store computer code, program instructions, computer instructions, program code associated with performing functions as described herein. The node 600 may also be configured with the selective relay circuitry 138, transmitter circuitry 150, receiver circuitry 152, replay cache circuitry 128, and single link neighbor circuitry 216. Interconnect 604 such as a bus (e.g., PCI, ISA, PCI-Express) may couple the controller 154, memory 602, selective relay circuitry 138, transmitter/receiver circuitry 150, 152, replay cache circuitry 128, and single link neighbor circuitry 216 to facilitate communication among these circuits. In the node 600, the memory 602 is coupled to the selective relay circuitry 138, transmitter/receiver circuitry 150, 152, replay cache circuitry 128, and single link neighbor circuitry 216 via the interconnect 604. In other examples, at least a portion of one or more of these circuitry may be integrated with the memory 602 or coupled directly to the memory 602. For example, the memory 602 may integrate the memory which stores the table 160 of the replay cache circuitry 128 or the single link neighbor list 216.

In one embodiment, a method for communication in a wireless mesh network is disclosed. The method comprises determining that a node in the wireless mesh network has received a threshold level of duplicate network protocol data units (PDUs); receiving, by the node, one or more network PDUs each comprising a respective segment of transport data in a transport PDU; and relaying, by the node, a subset of the received one or more network PDUs each comprising a respective segment to one or more neighboring nodes, the subset relayed based on the determination that the node has received a threshold level of duplicate network PDUs. In an embodiment, relaying the subset comprises relaying a received network PDU of the one or more received network PDUs based on a parity of a segment number associated with the received network PDU. In an embodiment, relaying the subset comprises relaying a received network PDU of the one or more received network PDUs based a segment number associated with the received network PDU having a first parity and not relaying the received network PDU based on the segment number associated with the received network PDU having a second parity. In an embodiment, the first parity is odd and the second parity is even or the first parity is even and the second parity is odd. In an embodiment, relaying the subset comprises relaying a received network PDU of the one or more received network PDUs based a segment number associated with the received network PDU being a first parity and a segment number associated with another received network PDU of the one or more received network PDUs being a second parity, wherein the first parity and second parity are different. In an embodiment, the node is a first node; wherein the first node receives the other network PDU with the segment number being the second parity from a second node which is a neighbor to the first node; and wherein a third node is a neighbor to the first node and the second node has a path to the third node. In an embodiment, the method further comprises determining that the other network PDU was received during a backoff period. In an embodiment, the threshold level is a number of duplicate network PDUs received by the node or a rate of duplicate network PDUs received by the node. In an embodiment, relaying the subset of the received one or more network PDUs comprises determining that the received one or more network PDUs in the subset are not received from a single link neighbor of the node. In an embodiment, relaying the subset comprises relaying a received network PDU of the one or more received network PDUs based a segment number associated with the received network PDU being a first parity and not relaying the received network PDU based on the segment number associated with the received network PDU being a second parity, the method further comprising determining that the node does not receive network PDUs associated with the segment number being the second parity; and relaying subsequent received network PDUs associated with the segment numbers with both parity based on the determination that the node does not receive network PDUs associated with the segment number with the second parity.

In another embodiment, a node is disclosed. The node comprises: receiver circuitry arranged to receive one or more network PDUs comprising respective segments of transport data in a transport PDU; and selective relay circuitry arranged to determine that the node has received a threshold level of duplicate network protocol data units (PDUs); and relay a subset of the received one or more network PDUs each comprising a respective segment to one or more neighboring nodes, the subset relayed based on the determination that the node has received a threshold level of duplicate network PDUs. In an embodiment, the selective relay circuitry arranged to relay the subset comprises the selective relay circuitry arranged to relay a received network PDU of the one or more received network PDUs based a parity of a segment number associated with the received network PDU. In an embodiment, the selective relay circuitry arranged to relay the subset comprises the selective relay circuitry arranged to relay a received network PDU of the one or more received network PDUs based a segment number associated with the received network PDU having a first parity and not relaying the received network PDU based on the segment number associated with the received network PDU having a second parity. In an embodiment, the first parity is odd and the second parity is even or the first parity is even and the second parity is odd. In an embodiment, the selective relay circuitry arranged to relay the subset comprises the selective relay circuitry arranged to relay a received network PDU of the one or more received network PDUs based a segment number associated with the received network PDU being a first parity and a segment number associated with another received network PDU of the one or more received network PDUs being a second parity, wherein the first parity and second parity are different. In an embodiment, the node is a first node; wherein the receiver circuitry is further arranged to receive the other network PDU with the segment number being the second parity from a second node which is a neighbor to the first node; and wherein a third node is a neighbor to the first node and the second node has a path to the third node. In an embodiment, the threshold level is a number of duplicate network PDUs received by the node or a rate of duplicate network PDUs received by the node. In an embodiment, the selective relay circuitry arranged to relay the subset of the received one or more network PDUs comprises the selective relay circuitry arranged to determine that the received one or more network PDUs in the subset are not received from a single link neighbor of the node. In an embodiment, the selective relay circuitry arranged to relay the subset comprises the selective relay circuitry arranged to relay a received network PDU of the one or more received network PDUs based a segment number associated with the received network PDU and a unicast address of the node.

In yet another embodiment, a node is disclosed. The node comprises: receiver circuitry arranged to receive a network protocol data unit (PDU) comprising a segment of transport data in a transport PDU; and selective relay circuitry arranged to determine that the node has received a threshold level of duplicate network PDUs; determine that the received network PDU is not from a single link neighbor; determine a parity of a segment number associated with the segment of the received network PDU; and relay a subset of the received network PDU comprising the segment to one or more neighboring nodes based on determination that the node has received a threshold level of duplicate network PDUs, the received network PDU is not from the single link neighbor, and the parity of the segment number.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as program code encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method for communication in a wireless mesh network, the method comprising:
    determining that a node in the wireless mesh network has received a threshold number of duplicate network protocol data units (PDUs);
    receiving, by the node, one or more network PDUs each comprising a respective segment of transport data in a transport PDU; and
    relaying, by the node, a subset of the received one or more network PDUs each comprising a respective segment to one or more neighboring nodes, the subset relayed based on the determination that the node has received the threshold number of duplicate network PDUs, wherein a duplicate PDU is an instance when two or more PDUs with a same source address and a same segment number is received.

2. The method of claim 1, wherein relaying the subset comprises relaying a received network PDU of the one or more received network PDUs based on a parity of a segment number associated with the received network PDU.

3. The method of claim 1, wherein relaying the subset comprises relaying a received network PDU of the one or more received network PDUs based a segment number associated with the received network PDU having a first parity and not relaying the received network PDU based on the segment number associated with the received network PDU having a second parity.

4. The method of claim 3, wherein the first parity is odd and the second parity is even or the first parity is even and the second parity is odd.

5. The method of claim 1, wherein relaying the subset comprises relaying a received network PDU of the one or more received network PDUs based a segment number associated with the received network PDU being a first parity and a segment number associated with another received network PDU of the one or more received network PDUs being a second parity, wherein the first parity and second parity are different.

6. The method of claim 5, wherein the node is a first node; wherein the first node receives the other network PDU with the segment number being the second parity from a second node which is a neighbor to the first node; and wherein a third node is a neighbor to the first node and the second node has a path to the third node.

7. The method of claim 5, further comprising determining that the other network PDU was received during a backoff period.

8. The method of claim 1, wherein the threshold level is a number of duplicate network PDUs received by the node or a rate of duplicate network PDUs received by the node.

9. The method of claim 1, wherein relaying the subset of the received one or more network PDUs comprises determining that the received one or more network PDUs in the subset are not received from a single link neighbor of the node.

10. The method of claim 1, wherein relaying the subset comprises relaying a received network PDU of the one or more received network PDUs based a segment number associated with the received network PDU being a first parity and not relaying the received network PDU based on the segment number associated with the received network PDU being a second parity, the method further comprising determining that the node does not receive network PDUs associated with the segment number being the second parity; and relaying subsequent received network PDUs associated with the segment numbers with both parity based on the determination that the node does not receive network PDUs associated with the segment number with the second parity.

11. A node comprising:
receiver circuitry arranged to receive one or more network PDUs comprising respective segments of transport data in a transport PDU; and
selective relay circuitry arranged to determine that the node has received a threshold number of duplicate network protocol data units (PDUs); and relay a subset of the received one or more network PDUs each comprising a respective segment to one or more neighboring nodes, the subset relayed based on the determination that the node has received the threshold number of duplicate network PDUs, wherein a duplicate PDU is an instance when two or more PDUs with a same source address and a same segment number is received.

12. The node of claim 11, wherein the selective relay circuitry arranged to relay the subset comprises the selective relay circuitry arranged to relay a received network PDU of the one or more received network PDUs based a parity of a segment number associated with the received network PDU.

13. The node of claim 11, wherein the selective relay circuitry arranged to relay the subset comprises the selective relay circuitry arranged to relay a received network PDU of the one or more received network PDUs based a segment number associated with the received network PDU having a first parity and not relaying the received network PDU based on the segment number associated with the received network PDU having a second parity.

14. The node of claim 13, wherein the first parity is odd and the second parity is even or the first parity is even and the second parity is odd.

15. The node of claim 11, wherein the selective relay circuitry arranged to relay the subset comprises the selective relay circuitry arranged to relay a received network PDU of the one or more received network PDUs based a segment number associated with the received network PDU being a first parity and a segment number associated with another received network PDU of the one or more received network PDUs being a second parity, wherein the first parity and second parity are different.

16. The node of claim 15, wherein the node is a first node; wherein the receiver circuitry is further arranged to receive the other network PDU with the segment number being the second parity from a second node which is a neighbor to the first node; and wherein a third node is a neighbor to the first node and the second node has a path to the third node.

17. The node of claim 11, wherein the threshold level is a number of duplicate network PDUs received by the node or a rate of duplicate network PDUs received by the node.

18. The node of claim 11, wherein the selective relay circuitry arranged to relay the subset of the received one or more network PDUs comprises the selective relay circuitry arranged to determine that the received one or more network PDUs in the subset are not received from a single link neighbor of the node.

19. The node of claim 11, wherein the selective relay circuitry arranged to relay the subset comprises the selective relay circuitry arranged to relay a received network PDU of the one or more received network PDUs based a segment number associated with the received network PDU and a unicast address of the node.

20. A node comprising:
receiver circuitry arranged to receive a network protocol data unit (PDU) comprising a segment of transport data in a transport PDU; and
selective relay circuitry arranged to determine that the node has received a threshold level of duplicate network PDUs; determine that the received network PDU is not from a single link neighbor; determine a parity of a segment number associated with the segment of the received network PDU; and relay a subset of the received network PDU comprising the segment to one or more neighboring nodes based on determination that the node has received a threshold level of duplicate network PDUs, the received network PDU is not from the single link neighbor, and the parity of the segment number.

* * * * *